US008050421B2

(12) United States Patent
Fukuda et al.

(10) Patent No.: US 8,050,421 B2

(45) Date of Patent: Nov. 1, 2011

(54) ACOUSTIC CORRECTION APPARATUS AND ACOUSTIC CORRECTION METHOD

(75) Inventors: Takashi Fukuda, Saitama (JP); Toshifumi Yamamoto, Tokyo (JP); Norikatsu Chiba, Kanagawa (JP); Yasuhiro Kanishima, Tokyo (JP); Kazuyuki Saito, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/775,973

(22) Filed: May 7, 2010

(65) Prior Publication Data

US 2010/0329481 A1 Dec. 30, 2010

(30) Foreign Application Priority Data

Jun. 30, 2009 (JP) ................................ 2009-156226

(51) Int. Cl.
*H04B 15/00* (2006.01)

(52) U.S. Cl. ......... 381/94.1; 381/317; 381/95; 381/94.7

(58) Field of Classification Search .......... 381/312–318, 381/320, 321, 23.1, 60, 94.1–94.3, 94.7, 381/59, 95, 96

See application file for complete search history.

(56) References Cited

U.S. PATENT DOCUMENTS 4,559,569 A * 12/1985 Otsuki et al. .................... 360/65
4,636,586 A * 1/1987 Schiff ...................... 379/406.08
5,295,192 A * 3/1994 Hamada et al. ............ 381/71.12
6,850,622 B2 * 2/2005 Maejima ......................... 381/22
6,898,293 B2 * 5/2005 Kaulberg ...................... 381/318
7,536,018 B2 * 5/2009 Onishi et al. ................. 381/71.8
7,953,229 B2 * 5/2011 Saito et al. ....................... 381/58
2008/0063228 A1 * 3/2008 Mejia et al. .................. 381/318
2008/0164942 A1 * 7/2008 Takeuchi et al. .............. 330/149
2010/0177910 A1 * 7/2010 Watanabe .................... 381/94.1
2010/0208910 A1 * 8/2010 Ohora .......................... 381/71.8

FOREIGN PATENT DOCUMENTS

JP 07-240989 9/1995
JP 10-126893 5/1998
JP 2000-092589 3/2000
JP 2007-235364 9/2007
WO WO-2009/041012 4/2009

* cited by examiner

*Primary Examiner* — Xu Mei

(74) *Attorney, Agent, or Firm* — Patterson & Sheridan, LLP

(57) ABSTRACT

According to one embodiment, an acoustic correction apparatus includes: a signal obtaining module configured to obtain an acoustic signal from a target space including an object and an external space; a signal output module configured to output to the target space a measurement signal; a coefficient identifying module configured to identify, on the basis of a response acoustic signal, a correction coefficient of a correction filter that reduces a resonance frequency component of a resonance in the object; a filtering module configured to use the correction filter, and filter the signal provided to the object; a noise cancelling module configured to remove, on the basis of the acoustic signal, a noise component comprised in the acoustic signal from the filtered signal; and an output module configured to output the acoustic signal, from which the noise component is removed by the noise cancelling module, to the object.

8 Claims, 8 Drawing Sheets

FIG.4
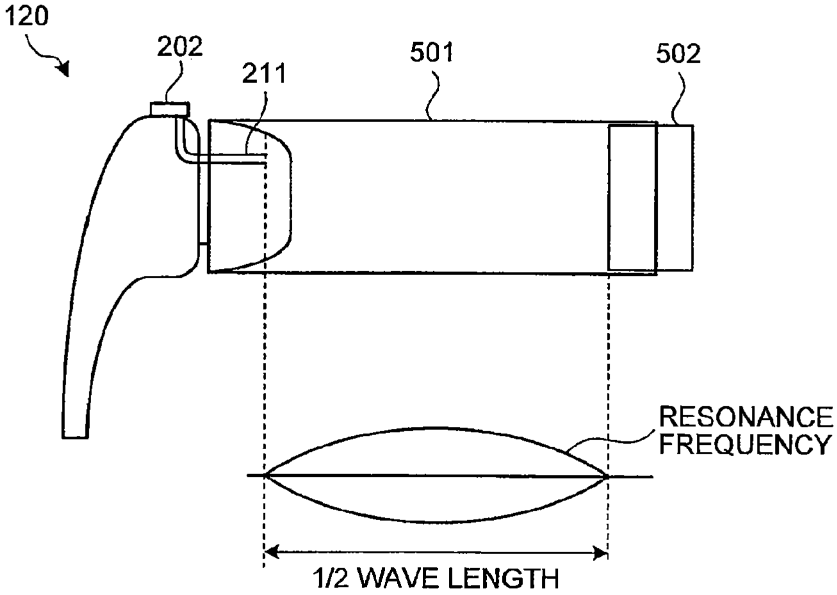
FIG.5
DO YOU WANT TO MEASURE ACOUSTIC CHARACTERISTICS?
0. NOT MEASURE CHARACTERISTICS
1. MEASURE CHARACTERISTICS OF BOTH EARS
2. MEASURE CHARACTERISTICS OF RIGHT EAR
3. MEASURE CHARACTERISTICS OF LEFT EAR
4. MEASURE CHARACTERISTICS LATER (x HOURS LATER)
FIG.6
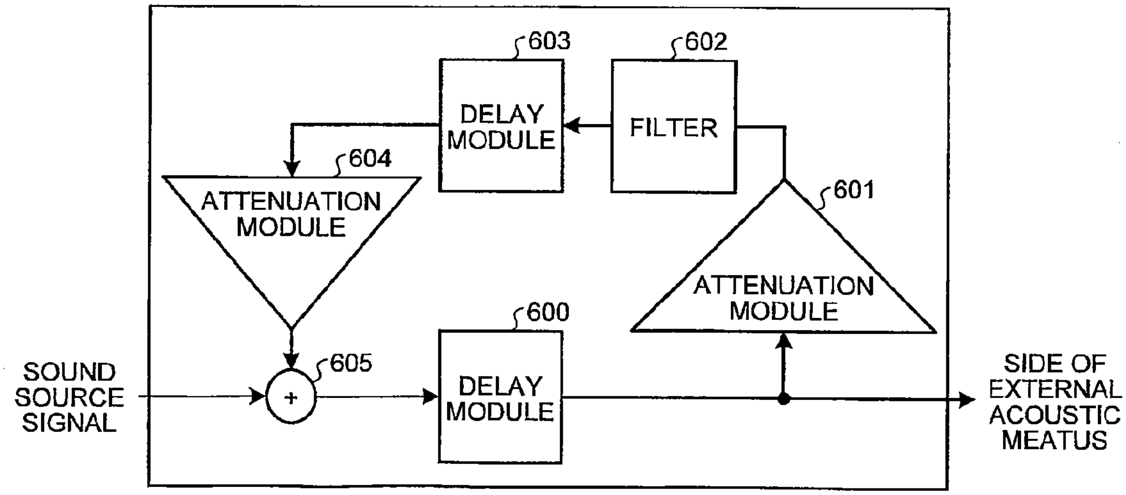

FIG.9

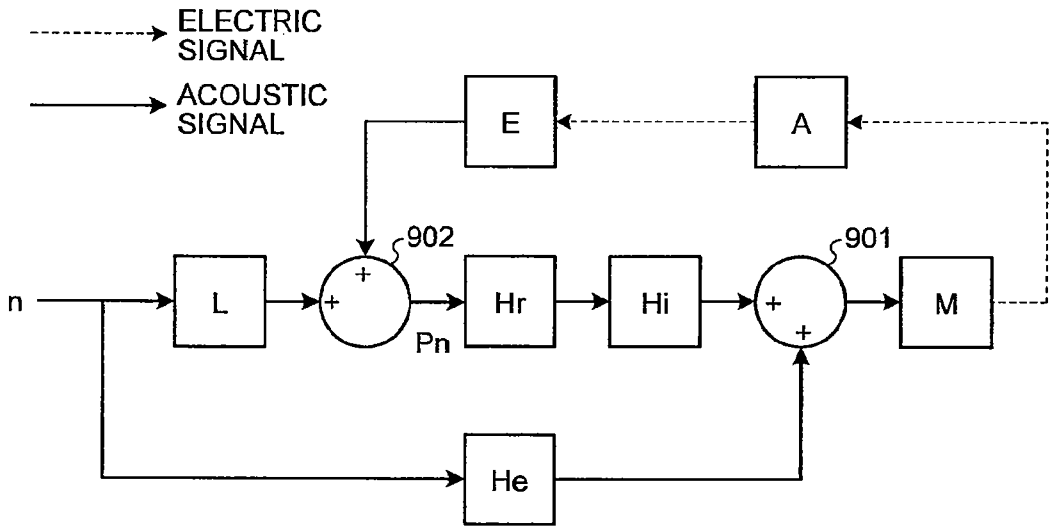

L: LEAKAGE CHARACTERISTIC
Hr: RESONANCE CHARACTERISTIC
Hi: INTERNAL SOUND PICKUP CHARACTERISTIC
He: EXTERNAL SOUND PICKUP CHARACTERISTIC
M: MICROPHONE CHARACTERISTIC
E: EARPHONE CHARACTERISTIC

FIG.10

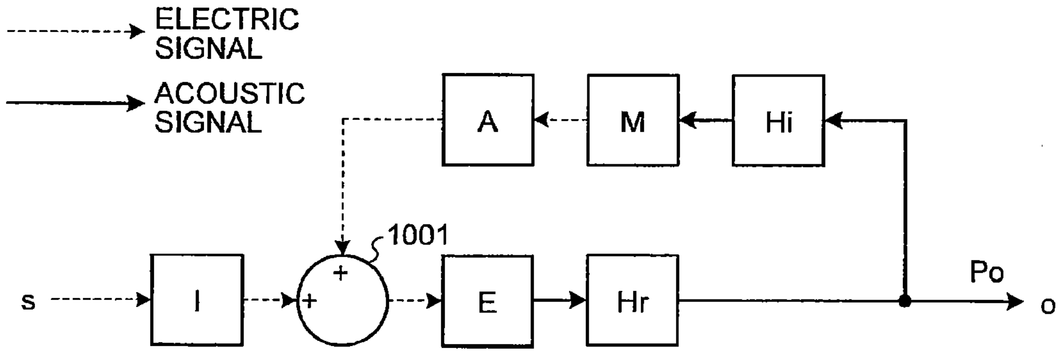

L: LEAKAGE CHARACTERISTIC
Hr: RESONANCE CHARACTERISTIC
Hi: INTERNAL SOUND PICKUP CHARACTERISTIC
He: EXTERNAL SOUND PICKUP CHARACTERISTIC
M: MICROPHONE CHARACTERISTIC
E: EARPHONE CHARACTERISTIC
I: RESONANCE CORRECTION FILTER

ACOUSTIC CORRECTION APPARATUS AND ACOUSTIC CORRECTION METHOD

CROSS-REFERENCE TO RELATED APPLICATIONS

This application is based upon and claims the benefit of priority from Japanese Patent Application No. 2009-156226, filed on Jun. 30, 2009, the entire contents of which are incorporated herein by reference.

BACKGROUND

1. Field

One embodiment of the invention relates to an acoustic correction apparatus and an acoustic correction method for processing an output acoustic signal.

2. Description of the Related Art

Portable acoustic reproducing apparatuses with which users can listen to reproduced sounds such as music using headphones and earphones are widely available to the general public. When a user listens to music and the like with these headphones and earphones, the sound the user listens to may deteriorate due to resonance phenomena caused by headphones and earphones closing the ears and noise caused by external environments.

In order to prevent the resonance phenomena, for example, Japanese Patent Application Publication (KOKAI) No. 2000-92589 describes an apparatus that has an earphone with which a microphone is integrated (hereinafter, referred to as earphone-microphone), and measures and obtains acoustic characteristics of ear canals using the earphone-microphone, thereby correcting resonance characteristics of the ear canals using an adaptive equalization filter.

In the technique disclosed in Japanese Patent Application Publication (KOKAI) No. 2000-92589, however, the microphones are used only for correcting the resonance characteristics, and not used for noise cancelling. Further, since the microphone is arranged on the side of the ear canals for correcting the resonance phenomena, additional microphones are needed when microphones for noise cancelling are necessary.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

FIG. 4 is an exemplary conceptual diagram of a model of an ear canal representing an acoustic tube into which the earphone is inserted, in the embodiment;

FIG. 5 is an exemplary diagram of a mode switching screen in the embodiment;

FIG. 6 is an exemplary block diagram of an acoustic model established by a correction coefficient identifying module, and used by a correction filter, in the embodiment;

FIG. 9 is an exemplary block diagram illustrating characteristics of configurations of the acoustic correction apparatus through which a noise signal n flows, in the embodiment;

FIG. 10 is an exemplary block diagram illustrating characteristics of configurations of the acoustic correction apparatus through which a sound source signal s passes during reproduction of a sound source signal, in the embodiment;

DETAILED DESCRIPTION

Various embodiments according to the invention will be described hereinafter with reference to the accompanying drawings. In general, according to one embodiment of the invention, an acoustic correction apparatus comprises: a signal obtaining module configured to obtain an acoustic signal from a target space including an object to be measured and from an external space excluding the object; a signal output module configured to output to the target space a measurement signal for measuring an acoustic characteristic of the object; a coefficient identifying module configured to identify, on the basis of a response acoustic signal in the acoustic signal obtained by the signal obtaining module, a correction coefficient of a correction filter that reduces a resonance frequency component of a resonance in the object, the response acoustic signal being a response to the measurement signal output by the signal output module; a filtering module configured to use the correction filter having the identified correction coefficient, and filter the signal provided to the object; a noise cancelling module configured to remove, on the basis of the acoustic signal obtained by the signal obtaining module from the target space and the external space, a noise component comprised in the obtained acoustic signal from the signal filtered by the filtering module; and an output module configured to output the acoustic signal, from which the noise component is removed by the noise cancelling module, to the object.

According to another embodiment of the invention, an acoustic correction method executed by an acoustic correction apparatus, the acoustic correction method comprises: a signal obtaining module obtaining an acoustic signal from a target space including an object to be measured and from an external space excluding the object; a signal output module outputting to the target space a measurement signal for measuring an acoustic characteristic of the object; a coefficient identifying module identifying, on the basis of a response acoustic signal in the acoustic signal obtained by the signal obtaining module, a correction coefficient of a correction filter that reduces a resonance frequency component of a resonance in the object, the response acoustic signal being a response to the measurement signal output by the signal output module; a filtering module using the correction filter having the identified correction coefficient and filtering the signal provided to the object; a noise cancelling module removing, on the basis of the acoustic signal obtained by the signal obtaining module from the target space and the external space, a noise component comprised in the obtained acoustic signal from the signal filtered by the filtering module; and an output module outputting the acoustic signal, from which the noise component is removed by the noise cancelling module, to the object.

Figure 1:
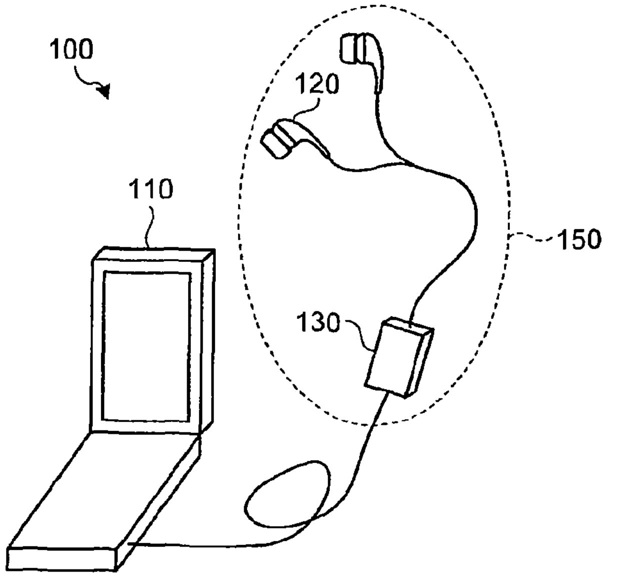
FIG. 1 is an exemplary diagram of an acoustic reproducing apparatus according to a embodiment of the invention.

FIG. 1 is a diagram illustrating an exemplary acoustic reproducing apparatus 100 according to a embodiment. In FIG. 1, the acoustic reproducing apparatus 100 comprises an acoustic correction apparatus 150 and a portable telephone terminal 110. The acoustic correction apparatus 150 comprises earphones 120 and a body section 130.

The portable telephone terminal 110 has a sound data generating module (not illustrated) which generates (reproduces) audio data and outputs the audio data to the acoustic correction apparatus 150. The acoustic correction apparatus 150 performs resonance characteristics correction and noise cancelling processing on input audio data (sound source signal), and thereafter, outputs the processed acoustic signal through the earphone 120 to an object to be measured. In the first embodiment, the object is assumed to be the ear canal of a user. The earphone 120 has a built-in microphone. In the following, the earphone 120 will be explained.

Figure 2:
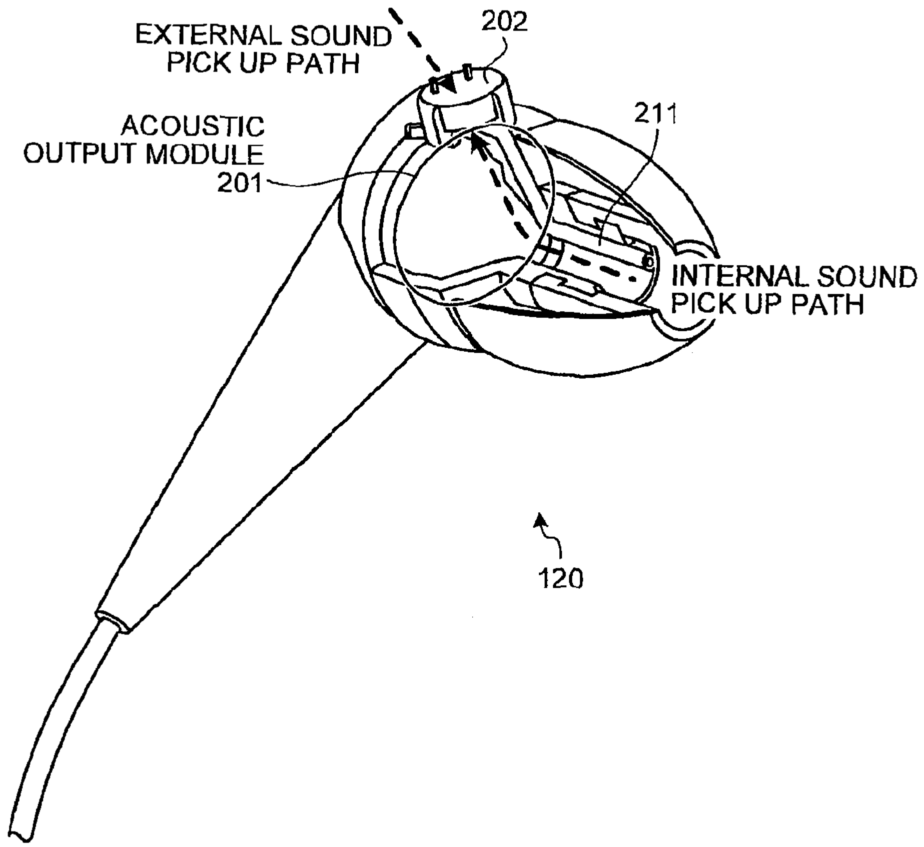
FIG. 2 is an exemplary structural diagram illustrating a shape of an earphone in the embodiment.

FIG. 2 is a structural diagram illustrating the shape of the earphone 120 in the embodiment. As illustrated in FIG. 2, the earphone 120 comprises a microphone 202 and an acoustic output module 201 (sound tube) for outputting sound. The acoustic output module 201 and the microphone 202 of the earphone 120 are electrically connected to the body section 130 of the acoustic correction apparatus 150.

The acoustic output module 201 outputs sound with respect to the position of the eardrum in the ear canal when the user wears the earphone 120.

The microphone (acoustic input module) 202 receives (picks up) sound transmitted through an external sound pickup path and sound transmitted through an internal sound pickup path. The external sound pickup path is a path through which sound is transmitted to the microphone 202 from an external space. The internal sound pickup path is a path through which sound is transmitted to the microphone 202 from a measurement target space including the object to be measured (hereinafter also referred to as "within the ear canal"). In the embodiment, a path denoted by numeral 211 is formed in the earphone 120 in order to realize the internal sound pickup path. An opening section of the path 211 arranged on the side of the ear canal is assumed to be arranged in proximity to the acoustic output module 201.

In other words, it is necessary to pick up the sound in the ear canal in order to correct resonance in the ear canal. It is also necessary to pick up the sound in the external environment in order to reduce noise. Therefore, the space from which sound is picked up in order to correct resonance differs from the space from which sound is picked up in order to reduce noise. Therefore, it is considered necessary to provide two microphones such as a microphone for picking up sound from the ear canal and a microphone for picking up sound from the external environment. In the embodiment, however, only one microphone 202 is arranged for each ear. Since the microphone 202 is arranged with the external sound pickup path and the internal sound pickup path, the microphone 202 can pick up sounds from two spaces. The acoustic correction apparatus 150 according to the embodiment performs resonance correction and noise cancelling in view of the fact that the sound is picked up through two paths. In the following, the configuration of the acoustic correction apparatus 150 will be explained.

Figure 3:
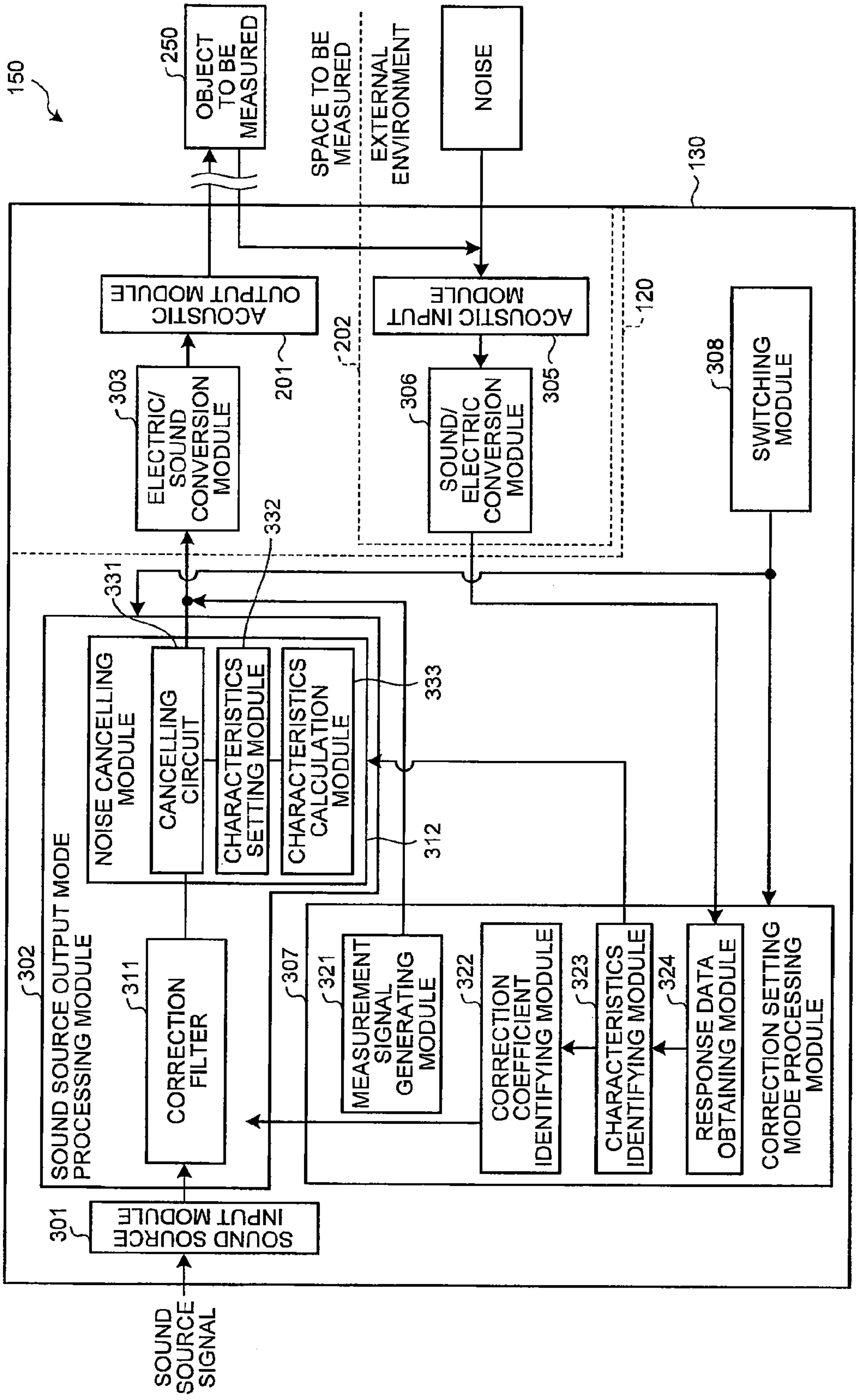
FIG. 3 is an exemplary block diagram of an acoustic correction apparatus in the embodiment.

FIG. 3 is a block diagram illustrating the configuration of the acoustic correction apparatus 150 according to the embodiment. As illustrated in this figure, the acoustic correction apparatus 150 comprises the body section 130 and the earphone 120.

The earphone 120 comprises an electric/sound conversion module 303, the acoustic output module 201, and the microphone 202. The microphone 202 comprises an acoustic input module 305 and a sound/electric conversion module 306. For example, a speaker arranged on the earphone 120 plays the roles of both of the electric/sound conversion module 303 and the acoustic output module 201.

The electric/sound conversion module 303 converts a sound source signal, i.e., an electric signal, provided by the body section 130 into an acoustic signal, i.e., sound. The acoustic output module 201 outputs the acoustic signal.

The acoustic input module 305 of the microphone 202 receives an input of the acoustic signal from within the user's ear canal (the measurement target space illustrated in FIG. 3) and from the external environment. In the embodiment, when the acoustic output module 201 outputs an acoustic signal for measurement (hereinafter referred to as "measurement acoustic signal"), the acoustic input module 305 receives the input of a response acoustic signal in response to the measurement acoustic signal.

The acoustic input module 305 receives the input of the acoustic signal when the body section 130 performs noise cancelling, which will be explained later.

The sound/electric conversion module 306 converts the received acoustic signal (the response acoustic signal) into an electric signal. In the embodiment, the response acoustic signal converted into electric signal is adopted as a response signal.

Correction appropriate for the user can be achieved by cancelling a resonance frequency at the eardrum position. However, it is difficult to arrange a microphone at the eardrum position of the user on every use. Therefore, in the embodiment, the opening section of the path 211 of the internal sound pickup path is arranged in proximity to the acoustic output module 201. This reason will be explained below.

FIG. 4 is a conceptual diagram illustrating a structure of an acoustic tube 501 into which the earphone 120 is inserted. The acoustic tube 501 is a model of the ear canal. As illustrated in FIG. 4, the resonance frequency corresponds to a wave length that is twice a distance between an eardrum position 502 and the acoustic output module 201 of the earphone. If sound is picked up at an anti-node of a standing wave (resonance wave), a peak value of the standing wave cannot be obtained, and consequently, it is difficult to identify frequency characteristics at a resonance peak.

Hence, the opening section of the path 211 of the internal sound pickup path is arranged at the node of the standing wave, i.e., in proximity to the acoustic output module 201 of the earphone 120. With this structure, the same frequency characteristics (resonance frequency) as those at the resonance peak can be obtained not only at the eardrum position 502 but also at the opening section of the path 211 of the internal sound pickup path arranged in proximity to the acoustic output module 201.

In the embodiment, resonance characteristics are corrected using the acoustic model established by making use of the fact that the same resonance frequency as that of the resonance peak can be obtained. This enables correction with little deterioration in the sound quality. In other words, the peak value of the resonance frequency at the eardrum position 502 can be cancelled by setting a correction coefficient for cancelling the peak value of the resonance frequency measured at the entrance of the ear canal (the position in proximity to the earphone 120).

The acoustic correction apparatus 150 according to the embodiment identifies a resonance frequency for each ear and performs correction according to the identified resonance frequency. As a result, appropriate correction can be performed for each ear.

Reference is made back to FIG. 3. The body section 130 comprises a sound source input module 301, a sound source output mode processing module 302, a correction setting mode processing module 307, and a switching module 308.

It should be noted that the acoustic correction apparatus 150 according to the embodiment has two kinds of processing modes. One of these processing modes is a correction setting mode for measuring the frequency characteristics of the ear canal of the user and identifying the correction coefficient used by the correction filter 311. At that occasion, the calculated resonance characteristics are set so as to be applicable to noise cancelling.

The other of these processing modes is a sound source output mode for causing the correction filter 311 to correct the sound source signal and perform noise cancelling using the identified correction coefficient and thereafter outputting the processed signal as an acoustic signal.

The frequency characteristics used in the correction carried out according to the embodiment are characteristics of a frequency at which a resonance occurs in the ear canal when the earphone 120 is attached thereto. Hereinafter, a case when, not only a resonance frequency, but also a gain at the resonance frequency are used as physical quantities characterizing a frequency is explained.

The switching module 308 switches between the correction setting mode and the sound source output mode. In the correction setting mode, the correction setting mode processing module 307 performs processing for setting a correction filter. In the sound source output mode, the sound source output mode processing module 302 processes the sound source signal input to the sound source input module 301, and thereafter outputs the acoustic signal to the object to be measured.

In the embodiment, the electric signal input as sound data from the portable telephone terminal 110 is adopted as the sound source signal. The sound output by the acoustic output module 201 of the earphone 120 is adopted as the acoustic signal.

The acoustic correction apparatus 150 according to the embodiment displays a screen for allowing switching between the modes on the portable telephone terminal 110. FIG. 5 is a figure illustrating an example of a mode switching screen. In the exemplary screen illustrated in FIG. 5, when an option "0. Not measure characteristics" is selected, the switching module 308 switches to the sound source output mode. When other options are selected, the switching module 308 switches to the correction setting mode.

The correction setting mode processing module 307 comprises a measurement signal generating module 321, a correction coefficient identifying module 322, a characteristics identifying module 323, and a response data obtaining module 324. In the embodiment, when the switching module 308 switches to the sound source output mode, each of the modules performs processing as soon as the measurement signal generating module 321 generates a measurement reference signal.

The measurement signal generating module 321 generates the measurement reference signal that is an electric signal with which acoustic characteristics (frequency characteristics) of the ear canal are measured. This measurement reference signal is assumed to be an electric signal previously defined in order to measure the acoustic characteristics of the ear canal.

The measurement reference signal generated by the measurement signal generating module 321 is converted by the electric/sound conversion module 303 into an acoustic signal. The measurement reference signal converted into the acoustic signal is adopted as the measurement acoustic signal. In the embodiment, the measurement acoustic signal is a signal synthesized from a plurality of sine waves including at least one or more of: a module pulse, a time stretched pulse, a white noise, a band noise including a measured band, and a sine wave within the measured band.

The measurement acoustic signal converted by the electric/sound conversion module 303 is output through the acoustic output module 201 to the ear canal (the object 250 to be measured illustrated in FIG. 3). Thereafter, the acoustic input module 305 receives the input of the response (reflected) acoustic signal corresponding to the output measurement acoustic signal. Then, the response acoustic signal subjected to the input is converted by the sound/electric conversion module 306 into an electric signal. The converted electric signal is adopted as a response signal.

The response data obtaining module 324 obtains the response signal. The response signal is an electric signal converted from the response acoustic signal reflected by the ear canal. Then, the characteristics identifying module 323 analyzes the signal, and the correction coefficient identifying module 322 can obtain an appropriate correction coefficient.

The characteristics identifying module 323 analyzes the frequency characteristics of the obtained response signal, and identifies the acoustic characteristics (frequency characteristics) of the ear canal. More specifically, the characteristics identifying module 323 analyzes the response signal so as to identify a sound pressure level at the resonance peak and the resonance frequency at the resonance peak. A plurality of resonance peaks, e.g., a first resonance peak and a second resonance peak, are identified. Therefore, the resonance peaks according to the shapes of the ear canals of the user can be identified. It should be noted that any method, regardless of whether being well-known or not, can be adopted as the method for identifying the resonance frequency.

In the above processing, the characteristics identifying module 323 can also identify the resonance characteristics of the ear canal used for noise cancelling. Then, the characteristics identifying module 323 outputs the identified resonance characteristics to the noise cancelling module 312 of the sound source output mode processing module 302, which will be explained later.

The correction coefficient identifying module 322 identifies the correction coefficient on the basis of the acoustic characteristics (frequency characteristics) identified by the characteristics identifying module 323. In the embodiment, the correction coefficient identifying module 322 establishes an acoustic model on the basis of the peak value of the gain (the sound pressure level at the resonance peak) and the resonance frequency at the peak value. Further, an adaptive equalization filter is applied to the established acoustic model, so that the correction coefficient of the correction filter for cancelling the resonance peak is identified. In the embodiment, the correction coefficient identifying module 322 identifies, for example, a delay time as the correction coefficient.

For example, the following expression (1) holds between an acoustic velocity (V), a frequency (F), and a wave length (v). Needless to say, the acoustic velocity (V) in the expression (1) is a known value.

$$V=fv \quad (1)$$

A distance between the eardrum position and the entrance of the ear canal (between the position of the acoustic output module 201 of the earphone 120 and the position of the opening section of the path 211 of the internal sound pickup path) is ½v. In other words, the distance between the eardrum position and the entrance of the ear canal can be identified by identifying the resonance frequency. Further, the correction coefficient identifying module 322 can identify a propagation time taken to move the acoustic signal this distance.

Therefore, the correction coefficient identifying module 322 can establish the acoustic model of the ear canal in order to perform correction on the basis of the identified parameters. When the adaptive equalization filter is applied to the acoustic model, the correction coefficient identifying module 322 can identify the correction coefficient of the correction filter for reducing the component of the identified resonance frequency. For example, the correction coefficient identifying module 322 identifies a propagation time set in a delay device constituting the acoustic model used by the correction filter that cancels the resonance peak of the identified resonance frequency.

Further, the correction coefficient identifying module 322 not only identifies the propagation time (delay time) of a sound wave within the ear canal on the basis of the detected resonance frequency but also identifies a reflectance ratio on the basis of the sound pressure level at the resonance peak.

The sound source input module 301 receives the input of a sound source signal, based on which the acoustic signal is generated, provided to the ear canal.

The sound source output mode processing module 302 comprises the correction filter 311 and the noise cancelling module 312. When the mode is switched to the sound source output mode, the sound source signal subjected to the input processing performed by the sound source input module 301 is subjected to processing performed by the correction filter 311, the noise cancelling module 312, the electric/sound conversion module 303, and the acoustic output module 201 as explained below.

The correction filter 311 uses each module set with the correction coefficient in the acoustic model to perform a filtering on the sound source signal that has been subjected to the input processing. In this way, the correction processing can be performed. FIG. 6 is a figure illustrating an exemplary acoustic model established by the correction coefficient identifying module 322 and used by the correction filter 311.

As illustrated in FIG. 6, the acoustic model comprises delay modules 603 and 600 set with the identified delay time, attenuation modules 601 and 604, a filter 602, and an adder 605. The sound source signal having passed through these devices (the delay module 603, the attenuation modules 601 and 604, and the filter 602) returns back and is added by the adder 605 with the acoustic signal subjected to the input processing.

The delay modules 603 and 600 are set with the propagation time (delay time) identified by the correction coefficient identifying module 322. The resonance peak can be reduced by setting the propagation time corresponding to the resonance peak.

The attenuation module 601 is set with the reflectance ratio of the eardrum from the eardrum side, which has been identified by the correction coefficient identifying module 322. In the embodiment, the reflectance ratio is set by the correction coefficient identifying module 322 on the basis of the sound pressure level at the resonance peak.

The filter 602 is a filter for causing the reflectance ratio to have frequency dependency. In the embodiment, the filter 602 is assumed to be a high pass filter. The reason why a high pass filter is adopted is because it has a small amount of reflection in a lower region. In the embodiment, since no resonance occurs in a low frequency band, the filter 602 is designed to allow more signal to pass through in the low frequency band than in the high frequency band. In the embodiment, the high pass filter is adopted as the filter, but alternatively a band pass filter may be adopted.

The attenuation module 604 is set with a reflectance ratio of the earphone.

The adder 605 adds the sound source signal subjected to the filtering provided by the attenuation module 604 to the sound source signal subjected to the input processing.

In other words, the sound source signal subjected to the input processing passes through the delay module 600, the attenuation module 601, the filter 602, the delay module 603, and the attenuation module 604 and returns back, and thereafter is subjected to the input processing. Thereafter, the adder 605 adds the above sound source signal to the sound source signal that has not yet passed through the above devices. In this way, the correction is performed using the filter based on the established acoustic model. Therefore, the resonance peak can be suppressed, and the sound can be more natural.

Further, the correction filter 311 comprises the above acoustic model and the adaptive equalization filter. Therefore, the correction filter 311 can serve as a filter having the parameter (correction coefficient) based on the physical quantities characterizing the acoustic characteristics. It should be noted that various filters, regardless of whether being well-known or not, may be adopted as the adaptive equalization filter, and the description thereabout is omitted. Subsequently, the relationship between the acoustic model and the adaptive equalization filter applied to the acoustic model will be explained.

Figure 7:
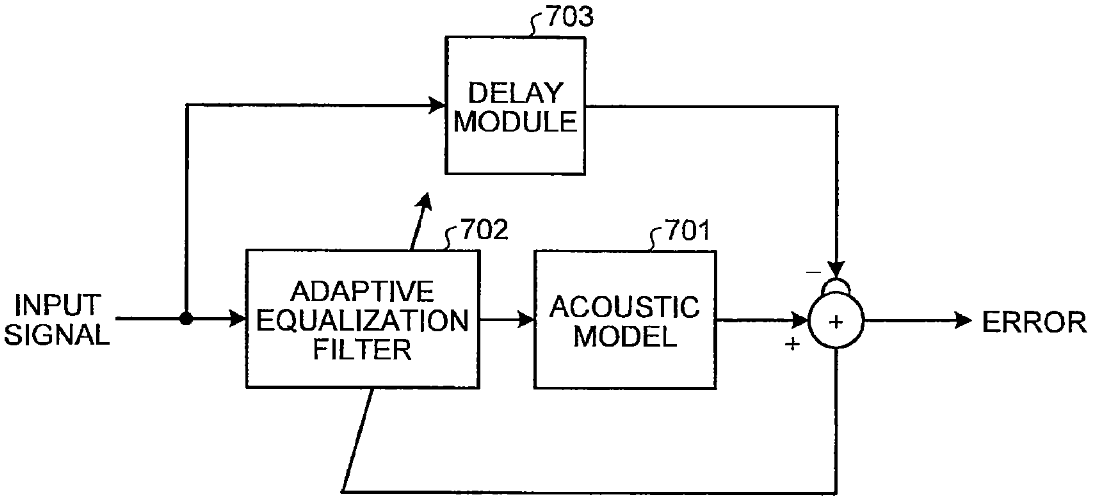
FIG. 7 is an exemplary block diagram of the acoustic model and an adaptive equalization filter in the embodiment.

As illustrated in FIG. 7, an acoustic model 701 and an adaptive equalization filter 702 are connected as a series-connected circuit, and use the same value as the coefficient of the adaptive equalization filter 702 used when a difference between an input signal and an output signal becomes the minimum.

An error can be obtained by subtracting the input signal input via the delay device 703 from the output signal output by the acoustic model 701. The correction filter 311 uses the error to suppress the resonance peak of the acoustic signal. It should be noted that any method can be adopted as the method for suppressing the resonance peak using the error, and the description thereabout is omitted.

The signal corrected by the correction filter 311 is converted by the electric/sound conversion module 303 into the acoustic signal, and thereafter subjected to noise cancelling performed by the noise cancelling module 312.

Reference is made back to FIG. 3. The noise cancelling module 312 comprises a characteristics calculation module 333, a characteristics setting module 332, and a cancelling circuit 331, and performs noise cancelling.

Figure 8:
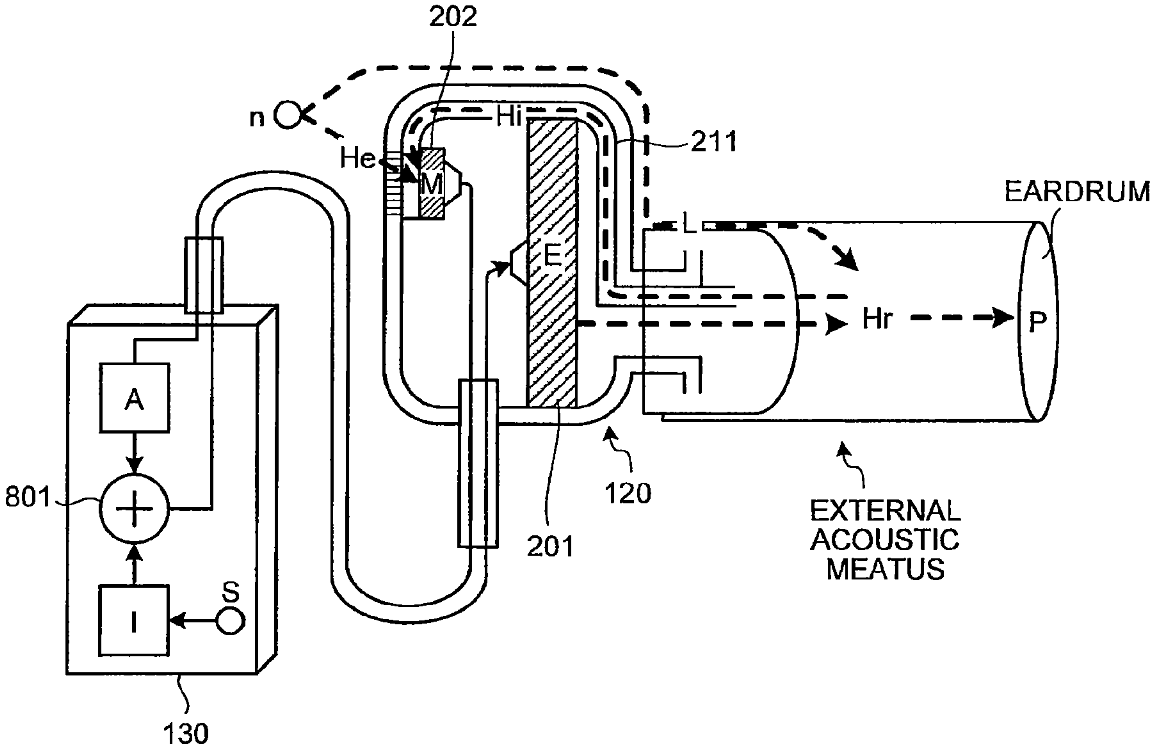
FIG. 8 is an exemplary schematic diagram of configurations of the acoustic correction apparatus used for noise cancelling, in the embodiment.

FIG. 8 is a schematic diagram illustrating configurations of the acoustic correction apparatus 150 according to the embodiment used for noise cancelling. FIG. 8 illustrates characteristics of the sections taken into consideration when a noise signal n is removed from an input sound source signal s. In the following, the characteristics of the sections will be explained.

In FIG. 8, He is a transfer characteristic of the external sound pickup path, M is a characteristic of the microphone 202, Hi is a transfer characteristic of the internal sound pickup path (hereinafter referred to as internal sound pickup characteristic), E is a characteristic of the earphone, P is a signal (sound pressure) presented to the eardrum, Hr is a transfer characteristic representing resonance in the ear canal (hereinafter referred to as resonance characteristic), L is a transfer characteristic when a noise leaks into the ear canal (hereinafter referred to as leakage characteristic), and I is a characteristics of the correction filter 311 in the body section 130 (hereinafter referred to as resonance correction filter characteristics). A transfer characteristic A is a characteristic of the cancelling circuit 331 for adjusting the noise signal n input from the microphone 202 (hereinafter referred to as cancelling circuit characteristic).

An adder 801 adds the input noise signal n to the transfer characteristic A, so that the transfer characteristic A is set with such a characteristic that the noise can be cancelled.

FIG. 9 is a block diagram illustrating characteristics of configurations in the acoustic correction apparatus 150 of the embodiment through which the noise signal n flows. The characteristics of FIG. 9 illustrate the characteristics of the configurations illustrated in FIG. 8.

In other words, the noise signal n is picked up from two paths, i.e., the external sound pickup path and the internal sound pickup path through which a noise has leaked into the ear canal from the external environment. More specifically, the noise signal n is picked up from the external transmission path (multiplied by characteristic He of the sound pickup from the external environment), and is obtained from the sound leaked from the external environment to the object to be measured (ear canal) (multiplied by the leakage characteristic L) and resonated (multiplied by the resonance characteristic Hr) via the internal transmission path (multiplied by the internal sound pickup characteristic Hi).

Then, the signals from these two paths are added by an adder 901, and are input to the microphone (multiplied by the microphone characteristic M). The signal input to the microphone is adjusted by a control circuit (multiplied by the cancelling circuit characteristic A), and is output through the earphone (multiplied by the earphone characteristic E).

Then, an adder 902 acoustically adds the signal leaked to the ear canal from the external environment (value obtained by multiplying the noise signal n by the leakage characteristic L) and the value output to the earphone by way of the above-described path. The sound pressure at that moment is represented by the below expression (2).

$$Pn=L\cdot n+(L\cdot Hr\cdot Hi+He)\cdot M\cdot A\cdot E\cdot n \tag{2}$$

When the sound pressure Pn is zero in the expression (2), the noise from the external environment is deemed to be removed. Therefore, the below expression (3) is obtained by substituting the sound pressure Pn=0 into the expression (2) and modifying the expression into an expression that derives the cancelling circuit characteristic A.

$$A=-L/((L\cdot Hr\cdot Hi+He)\cdot M\cdot E) \tag{3}$$

In other words, appropriate noise cancelling can be performed by setting the cancelling circuit 331 with a parameter corresponding to the cancelling circuit characteristic A illustrated in the expression (3).

Reference is made back to FIG. 3. In the correction setting mode, the characteristics calculation module 333 substitutes the resonance characteristic Hr input by the characteristics identifying module 323 into the expression (3) and calculates the cancelling circuit characteristic A. It should be noted that the other transfer characteristics and the like (L, Hi, He, M and E) are assumed to be previously determined values.

Then, the characteristics setting module 332 sets the cancelling circuit 331 with a parameter corresponding to the calculated cancelling circuit characteristic A.

In the sound source output mode, the cancelling circuit 331 removes noise from the sound source signal input via the correction filter 311, using the parameter set by the characteristics setting module 332.

The processing performed by the above modules enable appropriate noise cancelling even when the acoustic signal is input from the two paths of the microphone 202 possessed by the earphone 120.

In the following, it is considered the sound quality deteriorated by the sound source signal picked up from the internal transmission path when the noise cancelling is performed on the basis of the cancelling circuit characteristic A. FIG. 10 is a block diagram illustrating characteristics of the configurations of the acoustic correction apparatus 150 according to the embodiment, through which the sound source signal s passes during reproduction of the sound source signal from when the sound source signal s is input to when the sound source signal is output as the sound pressure Po. In FIG. 10, the noise signal n is assumed to have already been removed.

As illustrated in FIG. 10, an adder 1001 adds the signal adjusted by the cancelling circuit 331 and the signal obtained by filtering the sound source signal s with the correction filter (the resonance correction filter characteristics I). The signal adjusted by the cancelling circuit 331 is obtained as follows: the signal filtered by the correction filter is output as sound from the acoustic output module 201 of the earphone 120 (the earphone characteristic E) and resonates in the ear canal (resonance characteristic Hr); and the resonance sound is picked up by the microphone 202 (the characteristic M of the microphone) via the internal sound pickup path (the internal sound pickup characteristic Hi) and is adjusted by the cancelling circuit 331 (the cancelling circuit characteristic A). The signal added by the adder 1001 is output through the earphone 120, and the resonated sound is provided to the object to be measured. The sound pressure Po at that moment can be represented by the following expression (4).

$$Po=(1+Hi\cdot M\cdot A)\cdot Hr\cdot I\cdot E\cdot s \tag{4}$$

In the following, how much the sound quality deteriorates will be considered using specific values substituted into the above expressions. The sound insulation property (leakage property L) of a canal type earphone is assumed to be about −20 dB, and the microphone sensitivity (microphone characteristic M) is assumed to be about −50 dB. In this case, a cancelling circuit characteristic A of about 30 dB is derived from the expression (3).

The internal sound pickup path of the earphone 120 according to the embodiment is designed to have a transfer property whose sensitivity is lower by −6 dB compared with the external sound pickup path (it is understood that the sensitivities are more than the minimum sensitivity for holding the resonance peak in the correction setting mode.)

With the above-described characteristics, the terms Hi, M and A relating to variation of the sound quality are −20 dB or less. When these are substituted into the expression (4), the sound quality hardly deteriorates.

In other words, the acoustic correction apparatus 150 according to the embodiment having the above configuration can appropriately correct resonance occurring within the ear canal and remove noise using the noise cancelling function even when only one microphone 202 arranged on the earphone 120 is configured to simultaneously pick up not only the sound in the external environment obtained through the external sound pickup path but also the sound within the ear canal obtained through the internal sound pickup path. Further, the deterioration in the sound quality caused by the use of these functions can be prevented.

Figure 11:
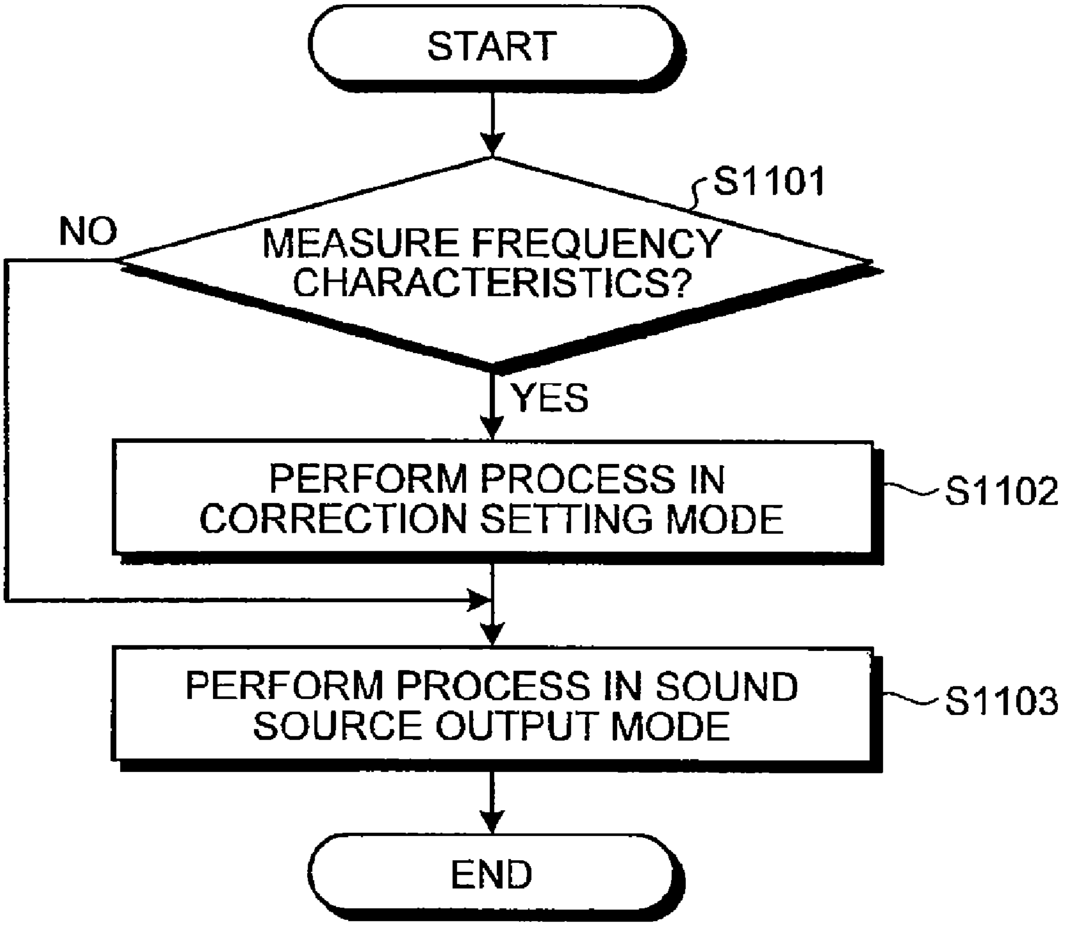
FIG. 11 is an exemplary flowchart of overall processing performed by the acoustic correction apparatus in the embodiment.

In the following, overall processing performed by the acoustic correction apparatus 150 according to the embodiment will be explained. FIG. 11 is a flowchart illustrating the above processing procedure performed by the acoustic correction apparatus 150.

First, the switching module 308 determines whether frequency characteristics should be measured (S1101). When the switching module 308 determines that the frequency characteristics (acoustic characteristics) should be measured (Yes at S1101), the correction setting mode processing module 307 performs processing in the correction setting mode (S1102). At that occasion, the noise cancelling module 312 configures settings based on the resonance characteristics.

On the other hand, when the switching module 308 determines that the frequency characteristics (acoustic characteristics) should not be measured (No at S1101) or when the processing of step S1102 is finished, the sound source output mode processing module 302 performs processing in the sound source output mode (S1103). The processing in each mode are executed according to the above processing procedure.

Figure 12:
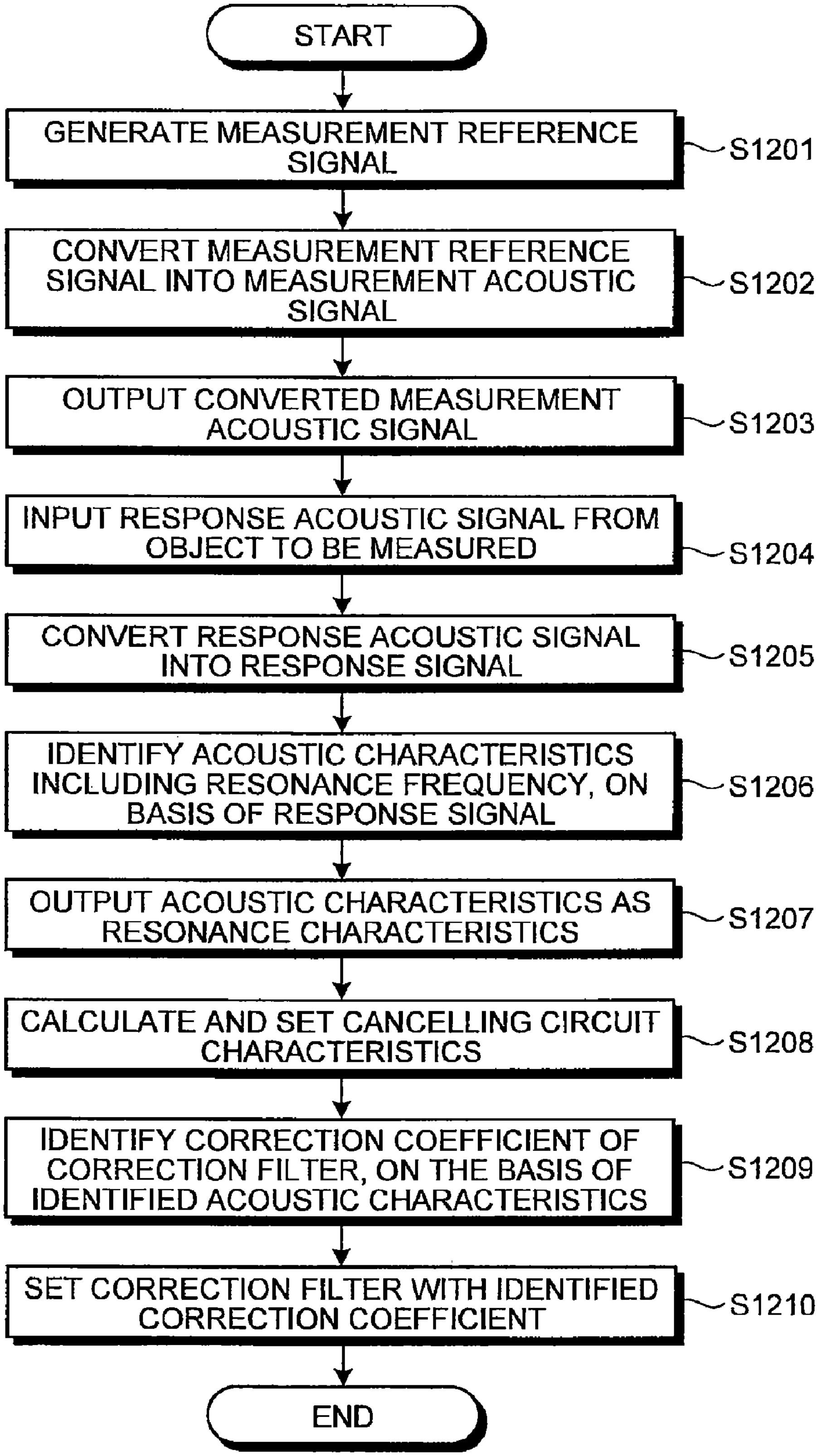
FIG. 12 is an exemplary flowchart of processing performed by the acoustic correction apparatus in the correction setting mode in the embodiment.

Next, the processing performed by the acoustic correction apparatus 150 according to the present embodiment in the correction setting mode will be explained. FIG. 12 is a flowchart illustrating the above processing performed by the acoustic correction apparatus 150 according to the embodiment.

First, the measurement signal generating module 321 generates a measurement reference signal that is an electric signal with which the acoustic characteristics (frequency characteristics) of the ear canal are measured (S1201). Subsequently, the electric/sound conversion module 303 converts the measurement reference signal into a measurement acoustic signal (S1202). Thereafter, the acoustic output module 201 outputs the measurement acoustic signal to the ear canal (S1203).

Thereafter, the acoustic input module 305 receives the input of the response acoustic signal reflected by the ear canal (S1204). Subsequently, the sound/electric conversion module 306 converts the response acoustic signal into a response signal, which is an electric signal (S1205).

Then, the response data obtaining module 324 obtains the response signal. Subsequently, the characteristics identifying module 323 identifies the acoustic characteristics including the resonance frequency (resonance peak and the like), on the basis of the response signal (S1206).

Then, the characteristics identifying module 323 outputs the acoustic characteristics (hereinafter referred to as resonance characteristics) at the identified resonance frequency to the characteristics calculation module 333 (S1207). In this way, the noise cancelling module 312 also configures settings using the resonance characteristics.

In response to the output of the resonance characteristics provided by the characteristics identifying module 323, the characteristics calculation module 333 of the noise cancelling module 312 uses the received resonance characteristics to calculate cancelling circuit characteristics appropriate for cancelling noise, and the characteristics setting module 332 sets the cancelling circuit 331 with a parameter corresponding to the calculated cancelling circuit characteristics (S1208).

On the other hand, in the correction setting mode processing module 307, the correction coefficient identifying module 322 establishes an acoustic model on the basis of the identified acoustic characteristics, and identifies a correction coefficient of the correction filter 311 including the acoustic model and the adaptive equalization filter (S1209). Thereafter, the correction coefficient identifying module 322 sets the identified correction coefficient to the correction filter 311 (S1210).

As a result of the above processing, the correction coefficient appropriate for the user's ear canal is set to the correction filter 311, and the cancelling circuit 331 is configured with the setting for cancelling noise.

Figure 13:
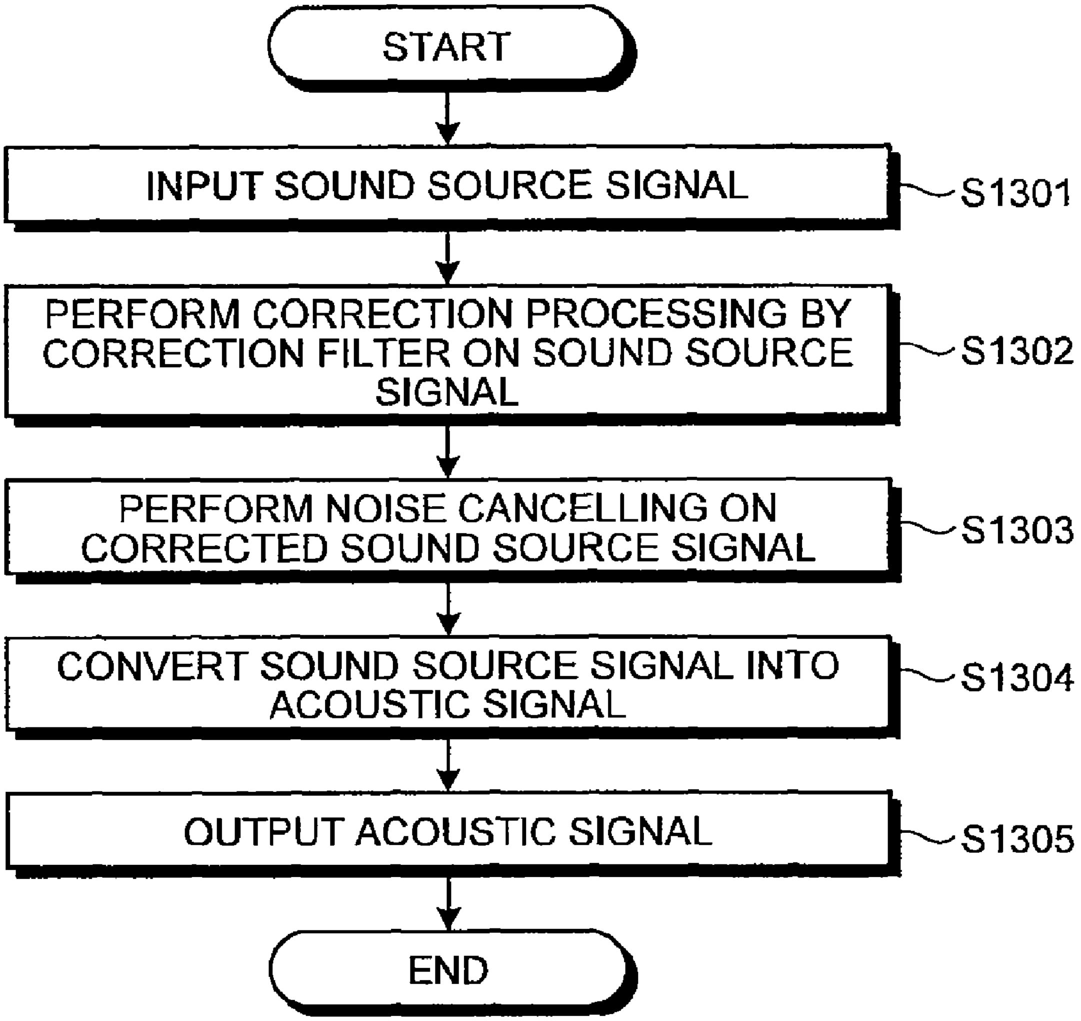
FIG. 13 is an exemplary flowchart of processing performed by the acoustic correction apparatus until the acoustic correction apparatus outputs the acoustic signal, in the embodiment.

Next, the processing for outputting the acoustic signal performed by the acoustic correction apparatus 150 according to the embodiment will be explained. FIG. 13 is a flowchart illustrating the above processing performed by the acoustic correction apparatus 150 according to the embodiment.

First, the sound source input module 301 receives the input of a sound source signal, which is an electric signal, provided by the portable telephone terminal 110 (S1301).

Subsequently, the correction filter 311 performs correction processing on the sound source signal (S1302).

Thereafter, the cancelling circuit 331 performs noise cancelling (cancelling of noise component) of the sound source signal subjected to the correction processing, on the basis of the set parameter (S1303).

Then, the electric/sound conversion module 303 converts into an acoustic signal the sound source signal from which the noise component is removed (S1304). Thereafter, the acoustic output module 201 outputs the acoustic signal to the ear canal (S1305).

The acoustic signal subjected to the correction processing according to the ears of a user can be output through the above processing procedure.

In the embodiment, the acoustic correction apparatus is applied to the earphone 120, but the embodiment is not limited thereto. For example, headphones may be used.

The acoustic correction apparatus 150 according to the embodiment can perform correction according to the features of the ears of the user. The acoustic correction apparatus 150 can also perform correction according to a difference between the right and left ears and a state of insertion.

Further, in the acoustic correction apparatus 150 according to the embodiment, the correction for suppressing the resonance peak is performed using the filter based on the above acoustic model. Therefore, the sound can be more natural without deteriorating the sound quality. Further, the acoustic correction apparatus 150 uses the acoustic characteristics and does not use an identification result and the like of the acoustic characteristics. Therefore, the acoustic correction apparatus 150 can be easily tuned using a small number of parameters, and it is possible to reduce the amount of calculation processing.

The acoustic correction apparatus 150 according to the embodiment is capable of noise canceling of a sound source signal on the basis of sound picked up from the external environment.

Further, the acoustic correction apparatus 150 according to the embodiment can perform resonance correction and noise cancelling on the basis of sound that one microphone 202 picked up from two paths. This structure enables reducing the cost incurred in the implementation. Further, the acoustic correction apparatus 150 according to the embodiment having the above structure can perform resonance correction and noise cancelling with one microphone 202, thus having a simpler arrangement and wirings and being smaller compared with conventional apparatuses.

According to the embodiment, there are less number of means for obtaining the acoustic signal needed in resonance characteristics correction and noise cancelling. Therefore, the embodiment provides an effect of reducing the cost in the implementation. Further, the embodiment provides an effect of simplifying arrangement and wirings and making the apparatus smaller.

The microphone 202 picks up sound from two paths. Of the two paths, the external sound pickup path is configured to have a transfer characteristic whose sensitivity is lower by −6 dB than the internal sound pickup path. Therefore, noise cancelling can be performed while hardly affected by sound within the ear canal. Any method can be adopted as the method for reducing the sensitivity. For example, a path 211 of the internal sound pickup path may be designed with materials and a diameter so as to have a sensitivity of −6 dB.

The acoustic characteristics correction program executed by the acoustic correction apparatus 150 according to the above embodiment may be provided upon being incorporated into a ROM and like.

The acoustic characteristics correction program executed by the acoustic correction apparatus 150 according to the above embodiment may be provided upon being recorded to a computer-readable recording medium such as a CD-ROM, a flexible disk (FD), a CD-R, and a DVD (Digital Versatile Disk) in a file in an executable format or an installable format.

Further, the acoustic characteristics correction program executed by the acoustic correction apparatus 150 according to the above embodiment may be provided as follows: the acoustic characteristics correction program is stored to a computer connected to a network such as the Internet so that the acoustic characteristics correction program can be downloaded via the network. The acoustic characteristics correction program executed by the acoustic correction apparatus 150 according to the above embodiment may be provided or distributed via a network such as the Internet.

The acoustic characteristics correction program executed by the acoustic correction apparatus 150 according to the above embodiment is modularized and comprises the above-described modules. In an actual hardware implementation, a CPU (processor) reads and executes the acoustic characteristics correction program or the acoustic characteristics measuring program from the above ROM. Accordingly, the above routines are loaded to a main storage device, and the above modules are generated on the main storage apparatus.

The various modules of the systems described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An acoustic correction apparatus comprising:

a signal obtaining module configured to obtain, through a single acoustic input module, an acoustic signal from a target space including an object to be measured and from an external space excluding the object;

a signal output module configured to output to the target space a measurement signal for measuring an acoustic characteristic of the object;

a coefficient identifying module configured to identify, on the basis of a response acoustic signal in the acoustic signal obtained by the signal obtaining module, a correction coefficient of a correction filter that reduces a resonance frequency component of a resonance in the object, the response acoustic signal being a response to the measurement signal output by the signal output module;

a filtering module configured to use the correction filter having the identified correction coefficient, and filter the signal provided to the object;

a noise cancelling module configured to remove, on the basis of the acoustic signal obtained by the signal obtaining module from the target space and the external space, a noise component comprised in the obtained acoustic signal from the signal filtered by the filtering module; and an output module configured to output the acoustic signal, from which the noise component is removed by the noise cancelling module, to the object.

2. The acoustic correction apparatus of claim 1, wherein the signal obtaining module is configured to obtain from the target space the acoustic signal that has a lower sound pressure level than the acoustic signal obtained from the external space.

3. The acoustic correction apparatus of claim 1 further comprising:

a frequency identifying module configured to identify a resonance frequency at a resonance peak in the obtained response signal, wherein the coefficient identifying module is configured to identify, on the basis of the identified resonance frequency, the correction coefficient of the correction filter that reduces the resonance frequency component, and wherein the noise cancelling module is configured to remove, on the basis of a characteristic of the identified resonance frequency, the noise component from the signal filtered by the filtering module.

4. The acoustic correction apparatus of claim 3, wherein the signal obtaining module is configured to obtain the noise component generated in the external space from the external space, and to obtain from the target space the noise component leaked from the external space into the target space, and wherein the noise cancelling module is configured to remove, on the basis of a leakage characteristic defined as a characteristic of leakage of the noise component generated in the external space into the target space, the noise component generated in the external space from the signal filtered by the filtering module.

5. The acoustic correction apparatus of claim 4, wherein the noise cancelling module is configured to remove the noise component, on the basis of a characteristic A of the noise cancelling module that can be derived from the following expression:

$$A=-L/((L\cdot Hr\cdot Hi+He)\cdot M\cdot E),$$

where A is the characteristic of the noise cancelling module, L is the leakage characteristic, Hr is a characteristic of the resonance frequency, Hi is a transfer characteristic of the target space, He is a transfer characteristic of the external space, M is a characteristic of the signal obtaining module, and E is a characteristic of the output module.

6. The acoustic correction apparatus of claim 1, further comprising an earphone arranged with the signal output module and the single acoustic input module.

7. The acoustic correction apparatus of claim 6, wherein the signal obtaining module obtains, from the target space and through a path arranged in the earphone, the acoustic signal input to the acoustic input module arranged on a side of the external space of the earphone.

8. An acoustic correction method executed by an acoustic correction apparatus, the acoustic correction method comprising:

obtaining, by a signal obtaining module through a single acoustic input module, an acoustic signal from a target space including an object to be measured and from an external space excluding the object;

outputting to the target space, by a signal output module, a measurement signal for measuring an acoustic characteristic of the object;

identifying, by a coefficient identifying module, on the basis of a response acoustic signal in the acoustic signal obtained by the signal obtaining module, a correction coefficient of a correction filter that reduces a resonance frequency component of a resonance in the object, the response acoustic signal being a response to the measurement signal output by the signal output module;

using, by a filtering module, the correction filter having the identified correction coefficient and filtering the signal provided to the object;

removing, by a noise cancelling module, on the basis of the acoustic signal obtained by the signal obtaining module from the target space and the external space, a noise component comprised in the obtained acoustic signal from the signal filtered by the filtering module; and outputting, by an output module, the acoustic signal, from which the noise component is removed by the noise cancelling module, to the object.

* * * * *